(12) United States Patent
Matama

(10) Patent No.: US 6,563,531 B1
(45) Date of Patent: May 13, 2003

(54) IMAGE PROCESSING METHOD

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/266,937

(22) Filed: Mar. 12, 1999

(30) Foreign Application Priority Data

Mar. 12, 1998 (JP) ............................................. 10-060260

(51) Int. Cl.[7] .......................... H04N 9/47; H04N 9/64; G06K 9/40; G01J 3/40
(52) U.S. Cl. ........................ 348/96; 382/274; 356/404; 348/577
(58) Field of Search ............................. 348/96, 97, 98, 348/103, 577; 396/173, 6, 175; 356/404; 355/35; 430/396; 382/274, 260, 169; 252/67; H04N 5/253, 3/36; G01J 3/40

(56) References Cited

U.S. PATENT DOCUMENTS 5,017,014 A * 5/1991 Terashita .................... 356/404
5,875,362 A * 2/1999 Szajewski ................... 396/175
5,905,817 A * 5/1999 Matama ...................... 382/260
5,949,962 A * 9/1999 Suzuki et al. ............... 348/577
6,101,273 A * 8/2000 Matama ...................... 382/169
6,118,907 A * 9/2000 Matama ...................... 382/274

* cited by examiner

Primary Examiner—Gims S. Philippe
(74) Attorney, Agent, or Firm—Birch, Stewart, Kolasch & Birch, LLP

(57) ABSTRACT

The image processing method of the invention for subjecting image data which is obtained by reading an image on a film photoelectrically to specified image processing, which comprises the step of: acquiring film characteristic of said film; and correcting the image data in accordance with the acquired film characteristic. According to this method, the characteristic change, particularly, gradation characteristic change of the film can be suitably corrected and as a result, a high-quality print having a high-quality image can be constantly and stably obtained.

16 Claims, 7 Drawing Sheets

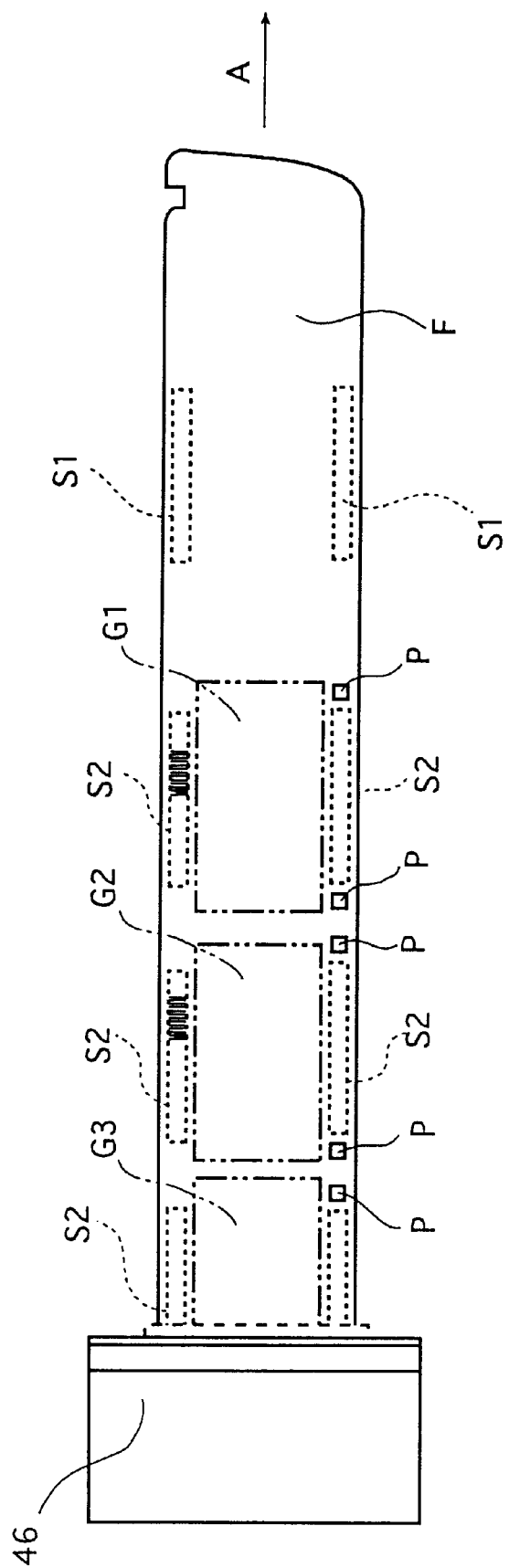

IMAGE PROCESSING METHOD

BACKGROUND OF THE INVENTION

This invention relates to the field of image processing technology for subjecting image data read photoelectrically from images on films by means of charge-coupled device (CCD) sensors and the like to specified image processing so that the read image data is converted to outputting image data.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital photoprinter, images can be processed as digital image data so that exposure conditions at the time of printing can be determined. Accordingly, the digital photoprinter is capable of performing effective image processing operations such as the correction of washed-out highlights or flat (dull) shadows due to the taking of pictures with backlight, an electronic flash or the like, sharpening processing and the correction of color or density failures. Such image processing operations of the digital photoprinter enable to produce high-quality prints that reproduce images of the quality that has been impossible to achieve by the conventional direct exposure technique. Moreover, not only the assembling of images and the splitting of a single image into plural images but also the composition of characters can be performed by processing the image data. As a result, prints can be outputted after various editing and/or processing operations have been performed in accordance with specific uses in the digital photoprinter.

Outputting images as prints is not the sole capability of the digital photoprinter; the image data can be supplied into a computer or the like and stored in recording media such as a floppy disk; hence, the image data can be put to various non-photographic uses.

Having these features, the digital photoprinter is basically composed of the following units: an image inputting apparatus having a scanner (image reading apparatus) that reads the image recorded on a film photoelectrically and an image processing apparatus that processes the read image to produce output image data (exposure conditions); and an image outputting apparatus having a printer (image recording apparatus) that records a latent image on a light-sensitive material by scan exposing it in accordance with the image data supplied from the image inputting apparatus and a processor (developing apparatus) that performs development processing on the exposed light-sensitive material to produce a print.

In the scanner, reading light issued by a light source is allowed to be incident on a film, from which projected light bearing the image recorded on the film is produced and focused by an image forming lens to form an image on an image sensor such as a CCD sensor or the like. The image is then subjected to photoelectric conversion and sent to the image processing apparatus as the image data (image data signals) on the film after being optionally subjected to various kinds of image processing steps.

In the image processing apparatus, image processing conditions are set on the basis of the image data captured with the scanner and image processing in accordance with the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image-bearing optical beam. In the processor, development and other processing in accordance with the light-sensitive material are performed to produce a print (photograph) reproducing the image that was recorded on the film.

In order to obtain high-quality prints, it is preferable that details of an image (image information) of a scene are recorded on a film as many and accurately as possible.

However, it is actually impossible to record all details of the scene on a film. Many image details (patterns) within over-exposed (excessively exposed) and under-exposed (insufficiently exposed) ranges cannot be recorded due to characteristic change (so-called characteristic deterioration) of the film.

Particularly, what unifies a lens and a film, so-called a one time use camera, or which is also called a single use camera, a film with lens or a snap shooting unit, cannot afford to install a variable diaphragm from a severe cost restriction so that the one time use camera is photographed over a wide exposure range. Accordingly, the one time use camera is liable to be under-exposed or over-exposed. In order to prevent the under-exposure, fitting up with an electronic flashing is an effective means, while no effective means exists to prevent over-exposure. Therefore, the one time use camera is liable to be over-exposed so that a high luminance region of a scene is easily sacrificed when the image is reproduced on a print.

SUMMARY OF THE INVENTION

An object of the present invention is to solve the above described problem in the prior art, and to provide an image processing method applicable to the above described digital photoprinter which reads an image recorded on a film photoelectrically, subjects the thus read image to an image processing and produces a print on which the image is reproduced, in which a high-quality image can be constantly obtained by suitably correcting the characteristic change of the film.

In order to achieve the above object, the present invention provides an image processing method for subjecting image data obtained by reading an image on a film photoelectrically to specified image processing, comprising the steps of:

acquiring film characteristic of said film; and correcting the image data in accordance with the acquired film characteristic.

Preferably, said film characteristic is gradation characteristic of said film.

Preferably said film is for a one-time use camera.

Preferably, said correction step is a step of correction corresponding to deterioration of said film characteristic.

Preferably, said correction corresponding to the deterioration of said film characteristic is correction mainly in an over-exposed range of the film.

It is preferred that said acquiring step is at least one of a process of storing film characteristics of plural kinds of the film in a storing means and thereafter reading out a corresponding film characteristic from the storing means by detecting a kind of the film, a process of reading film characteristic information recorded on the film optically, a process of reading the film characteristic information recorded on the film magnetically and a process of inputting the film characteristic by an operator.

In this case, said film kind is, preferably, detected from the film by using at least one of an optical process and a magnetic process.

Preferably, said film characteristic is corrected by difference data between standard development conditions and adopted development conditions.

Characteristics in the under-exposed (or insufficiently exposed) range of the film can be anticipated to some extent by acquiring a mask density (density in an unexposed region), even if characteristics information of the film are not provided. On the other hand, characteristics in the over-exposed (or excessively exposed) range can hardly be anticipated without characteristics information corresponding to each film kind, since it is not known at what point gradation (γ) characteristics curve turns to decrease or to be dull. Accordingly, in the one time use camera which is liable to be over-exposed, it is preferable to store the film characteristics corresponding to each film kind, and then to detect and read out the film kind, thereby correcting image data in accordance with the read-out film kind.

Moreover, the film characteristics are affected by development conditions. Therefore, it is more preferable that the film characteristics are so arranged as to be corrected by the difference data acquired by comparing the development conditions adopted at lab shops and the standard ones.

Furthermore, though a detrimental effect appears such that roughness caused by graininess of the film is emphasized when characteristic change (so-called dull or deterioration of characteristics) of gradation in the under-exposed range is corrected, image deterioration caused by grains of the film is essentially small in the over-exposed range so that the detrimental effect, that is, emphasis of roughness, is kept relatively low even if the characteristic change in the over-exposed range are corrected.

BRIEF DESCRIPTION OF THE DRAWINGS

FIG. 3 shows schematically a film of an Advanced Photo System (APS);

DETAILED DESCRIPTION OF THE INVENTION

An image processing method of the invention is now described in detail with reference to preferred embodiments shown in the accompanying drawings.

Figure 1:
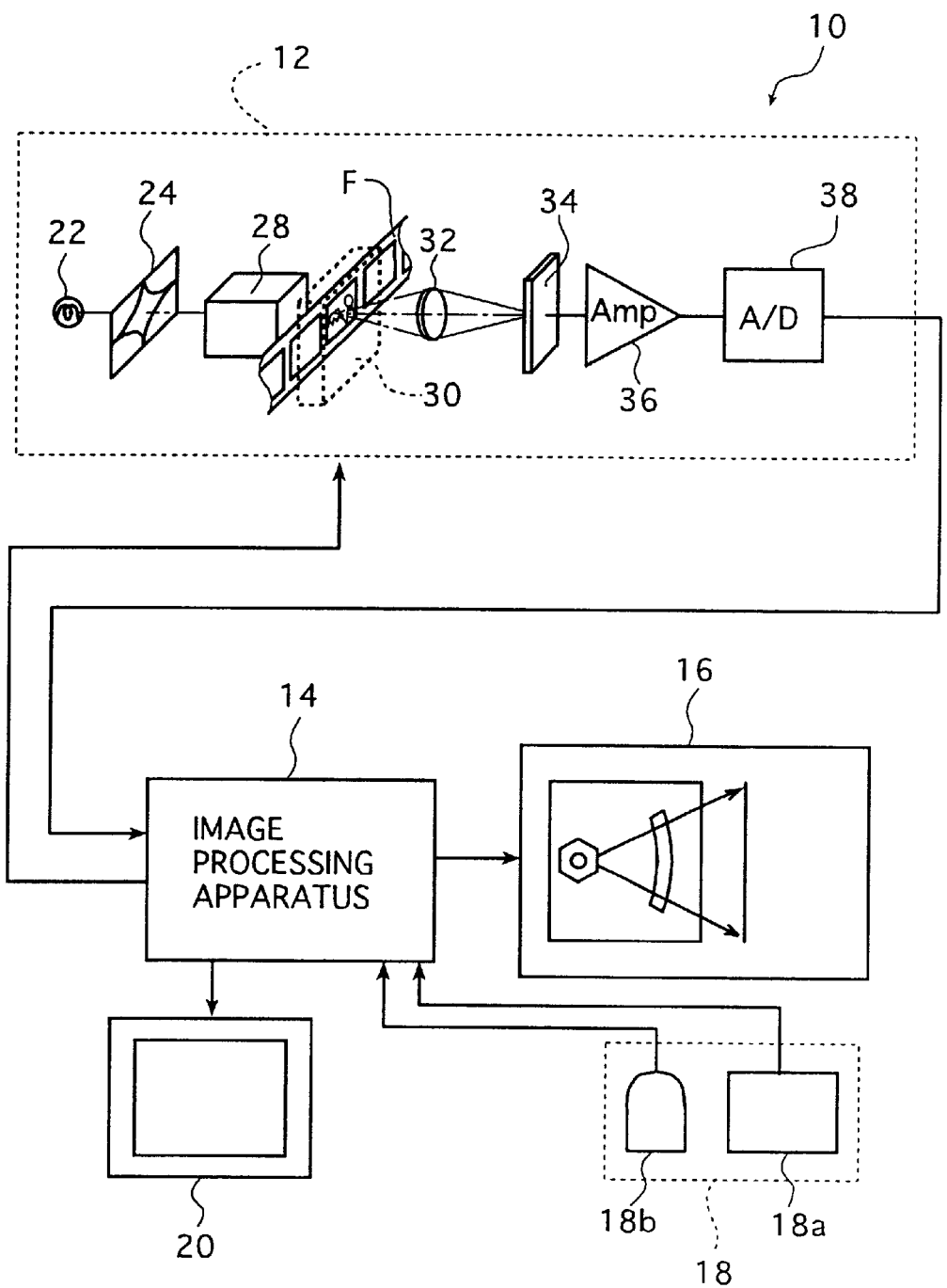
FIG. 1 is a block diagram of a digital photoprinter applying an example of an image processing method of the invention.

FIG. 1 is a block diagram of an exemplary digital photoprinter using the image processing method of the invention.

The digital photoprinter shown in FIG. 1 (which is hereunder referred to simply as "photoprinter 10") comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers are available that can be detachably loaded into the body of the scanner 12 in accordance with the type or the size of the film used (e.g. whether it is a film of the Advanced Photo System (APS) or a negative or reversal film of 135 size), the format of the film (e.g. whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 captures the images recorded on the film F in the following manner; the reading light from the light source 22 has its quantity adjusted by means of the variable diaphragm 24 and is incident on the film F held in the specified reading position by means of the carrier and thereafter passes through the film to produce projected light bearing the image recorded on the film F.

Figure 2A:
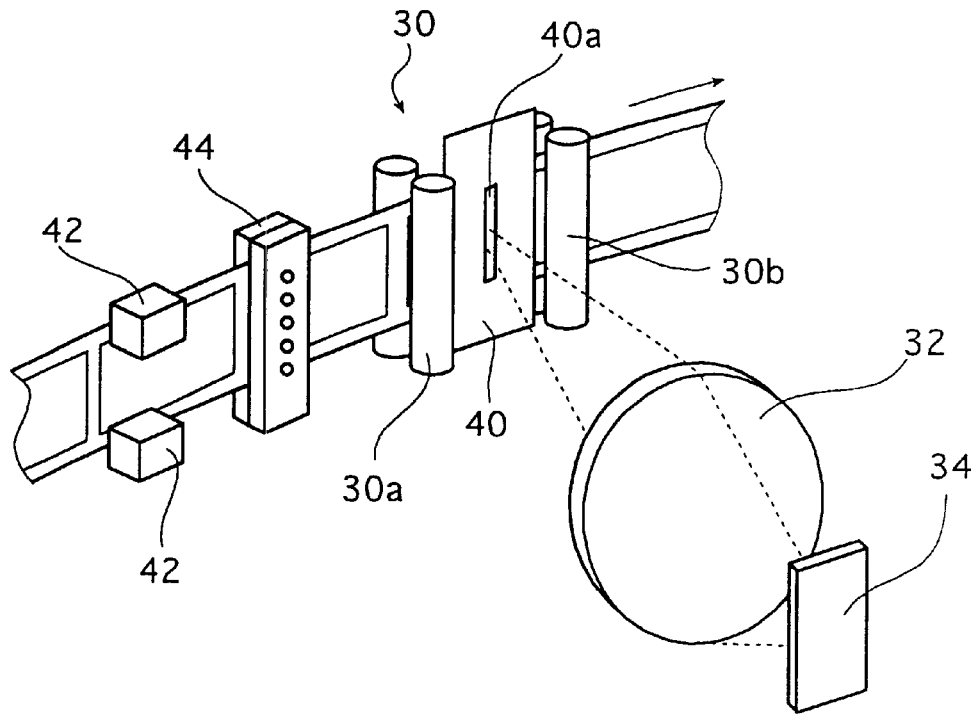
FIG. 2A is a schematic perspective view for illustrating a carrier to be installed in the digital photoprinter shown in FIG. 1.

The illustrated carrier 30 is adapted to handle films F of APS (or their cartridges). As shown schematically in FIG. 2A, the carrier 30 has two pairs of transport rollers 30a, and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

As is well known, magnetic recording media are preliminarily formed on an APS film to record various kinds of information. In addition, a camera, a developing machine and the carrier 30 write various kinds of information to the magnetic recording media or read them from the media optionally.

As FIG. 3 shows in conceptual form, an APS film F has a clear magnetic recording medium S formed in the following regions along its length (in the auxiliary scanning direction) a specified region downstream of the leading frame G1 in the direction in which the film F is unwound from the cartridge (in the direction of arrow A), regions corresponding to respective frames G and a specified region upstream of the last frame (not shown), particularly near both edges of the film width (in the main scanning direction).

Information about the film F taken as a whole such as cartridge ID, film type, sensitivity and the date of development are magnetically recorded in the magnetic recording media S1 near the leading (or trailing) end of the film F, and information about each frame such as the date and time of taking the picture, the presence or absence of light emission from an electronic flash when taking the picture and the title are recorded in the magnetic recording media S2 in the individual frame regions. In principle, camera-related information is recorded on one side of the width of the magnetic recording medium S whereas lab-related information is recorded on the other side.

Indicated by 46 in FIG. 3 is a cartridge housing for containing the film F and indicated by P are perforations for assisting in the transport (feeding and rewinding) of the film F.

The carrier 30 adapted to handle the APS film F also has two magnetic heads 42 corresponding to magnetic recording media S that read the information recorded on the magnetic recording media S and which also record the necessary information.

A code reader 44 is provided between each of the magnetic heads 42 and the mask 40 to optically read bar-codes such as DX code, expanded DX code, FNS code and the like that are recorded optically. A reading means for such bar codes recorded in a film is provided not only in the carrier 30 for APS but also in any conventional film carrier.

Various kinds of information captured by the magnetic heads 42 and the code reader 44 are optionally sent to specified sites in the image processing apparatus 14 and the like.

Figure 2B:
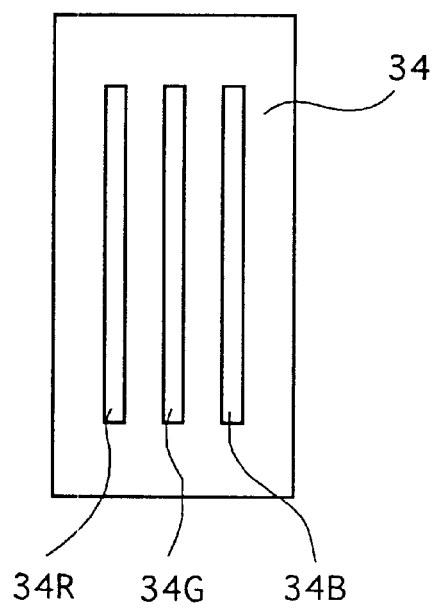
FIG. 2B shows in conceptual for an image sensor in the digital photoprinter shown in FIG. 1.

As already mentioned, the reading light passes through the film F held on the carrier 30 and the resulting image-bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading an R image, a line CCD sensor 34G for reading a G image, and a line CCD sensor 34B for reading a B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with Amp 36, converted to digital form in A/D converter 38 and sent to the image processing apparatus 14.

In the scanner 12, the images recorded on the film F are captured by two scans, the first being prescan at low resolution and the second being fine scan for obtaining output image data.

Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest.

The output signals for prescan and fine scan are essentially the same data except for resolution and output levels.

It should be noted that the scanner which constitutes an image inputting apparatus of the invention is by no means limited to a type that relies upon the slit scan technique described above but that it may be of a type that relies upon areal exposure, or a technique by which the image in one frame is scanned across at a time.

In this alternative approach, an area CCD sensor may be used with means of inserting R, G and B color filters between the light source and the film F. Images capturing with the area CCD sensor are performed by separating the image recorded on the film into three primary colors RGB with R, G and B color filters being sequentially inserted.

As already mentioned, the digital signals outputted from the scanner 12 are fed into the image processing apparatus 14 (which is hereinafter referred to as "processing apparatus 14").

Figure 4:
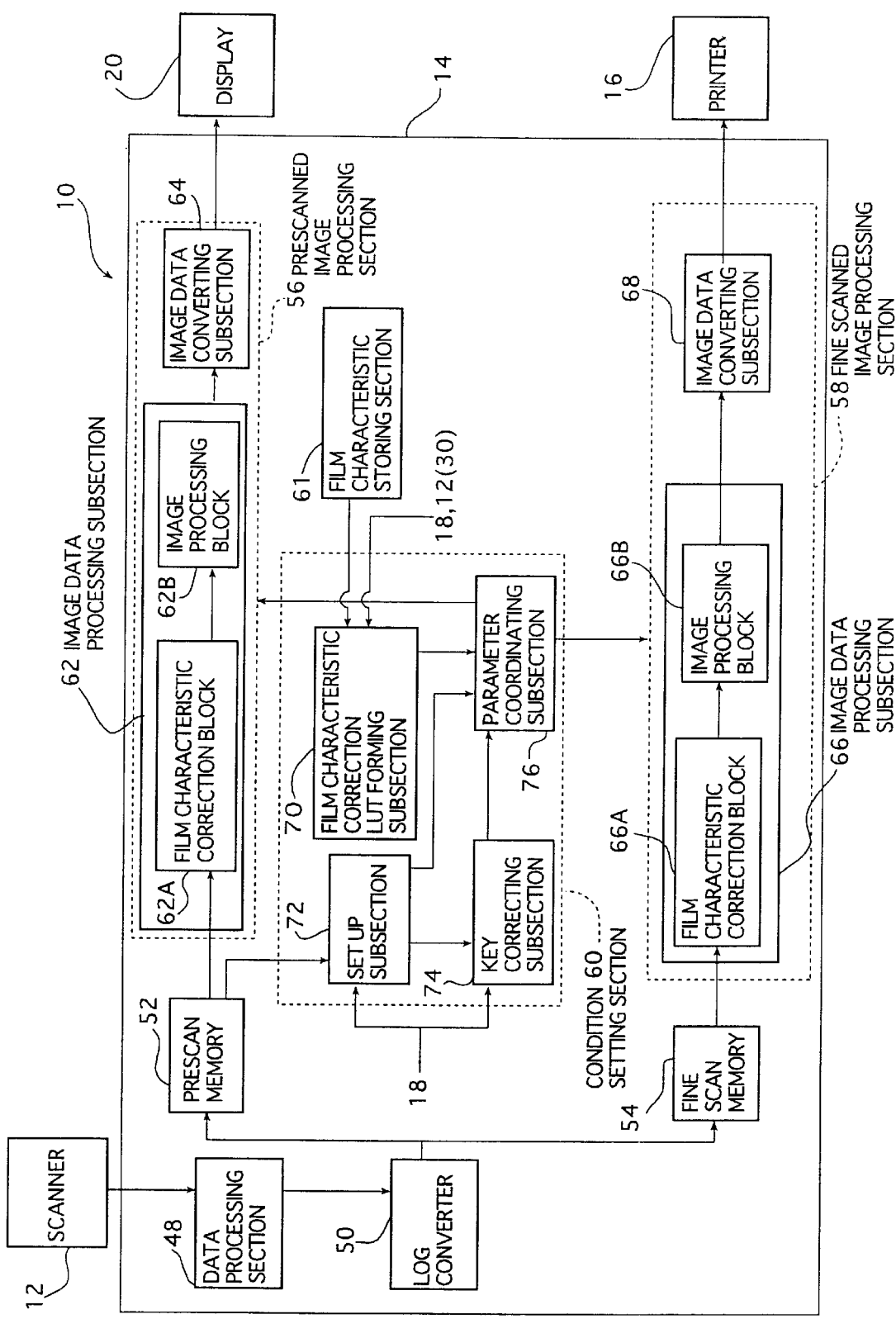
FIG. 4 is a block diagram of the image processing apparatus in the digital photoprinter shown in FIG. 1.

FIG. 4 is a block diagram of the processing apparatus 14, which comprises a data processing section 48, a log converter 50, a prescan (frame) memory 52, a fine scan (frame) memory 54, a prescanned image processing section 56, a fine scanned image processing section 58, a condition setting section 60 and a film characteristic storing section 61.

FIG. 4 shows only the sites related to image processing and besides these sites, the processing apparatus 14 includes a CPU for controlling and managing the overall operation of the photoprinter 10 including the processing apparatus 14, memories for storing the information necessary for the operation and the like of the photoprinter 10. The manipulating unit 18 and the display 20 are connected to related sites via the CPU and the like (CPU bus).

The R, G and B digital signals outputted from the scanner 12 are sent to the data processing section 48, where they are subjected to specified data processing steps such as dark correction, defective pixel correction and shading correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read into the prescanned image processing section 56 having an image data processing subsection 62 (hereinafter referred to as "processing subsection 62") and an image data converting subsection 64, whereas the fine scanned data stored in the fine scan memory 54 is read into the fine scanned image processing section 58 having an image data processing subsection 66 (hereinafter referred to as "processing subsection 66") and an image data converting subsection 68.

The processing subsection 62 in the prescanned image processing section 56 and the processing subsection 66 in the fine scanned image processing section 58 are the sites where the image (image data) captured with the scanner 12 is subjected to correction in accordance with film characteristics, and specified image processing steps in accordance with the conditions that are set by means of the condition setting section 60 to be described later in this specification.

The two processing subsections 62 and 66 perform basically the same processing except for resolution so that the following explanation is directed to the processing subsection 66 taken as a typical example.

The processing subsection 66 (or 62) is composed of a film characteristic correction block 66A (or 62A) and an image processing block 66B (or 62B).

The film characteristic correction block (hereinafter referred to as "characteristic correction block") 66A lessens the image quality deterioration of an outputted image derived from film characteristics by employing a film characteristic correction look-up table (LUT) formed in accordance with the characteristics of a film F which is an original of the image data. The block 66A will be described in detail later in this specification.

The image processing block 66B is the site of performing various image processing steps to the image data. Image processing steps performed in the image processing block 66B are by no means limited in any particular way and various image processing steps performed in known image processing apparatus such as color balance adjustment, gradation adjustment, density adjustment, saturation adjustment, electronic magnification, dodging (compressing/extending the density's dynamic range), sharpening (sharpness correction) and the like are exemplified. These processing steps are performed using LUT, matrix (MTX) operations, a low-pass filter and an adder, or using known means such as averaging and interpolation operation and the like.

The image data converting subsection 68 is a site where the image data processed by the processing subsection 66 is converted with a 3D (three-dimensional) LUT or the like into image data that is subsequently supplied into the printer 16 as image data corresponding to image recording with the printer 16.

The image data converting subsection 64 optionally thins out the image data processed by the processing subsection 62 and similarly converts the image data with a 3D-LUT or the like into image data that corresponds to the representation on the display 20 and which is subsequently displayed on the display 20.

The conditions for the processing to be done in the two image data converting subsections 64 and 68 are set in the condition setting section 60 which is described later in this specification.

The condition setting section 60 sets various conditions in the prescanned image processing section 56 and the fine scanned image processing section 58.

The condition setting section 60 comprises a film characteristic correction LUT forming subsection 70, a setup subsection 72, a key correcting subsection 74 and a parameter coordinating subsection 76.

The film characteristic correction LUT forming subsection 70 (hereinafter referred to as "LUT forming subsection 70") forms a film characteristic correction LUT (hereinafter referred to as "characteristic correction LUT") to be set in the above described characteristic correction block 66A (or 62A).

As described above, though the image having a wide range of density is recorded in the film F, film characteristics, particularly its gradation characteristic change (or the characteristics dull) in its over- and under-exposed ranges so that details of the image (image information amount) to be recorded on the film is decreased and therefore the details of the image which cannot be reproduced in a print within a scene recorded on the film is increased. Particularly, a one time use camera or a film with lens that is not provided with a variable diaphragm from a cost restriction is liable to be under-exposed or over-exposed. Though effective means such as an electronic flashing and the like exists to prevent under-exposure, no effective means exists to prevent over-exposure so that a high luminance region in a scene is liable to be sacrificed in a print. Moreover, such film characteristic change as described above differs in accordance with the kind of film.

The LUT forming subsection 70 forms the characteristic correction LUT for lessening the image quality deterioration of an output image caused by the film characteristic change of the film F, that is, for correcting the film characteristic change, by utilizing film characteristics of the film F which is an original and then provides the resulted LUT to the parameter coordinating subsection 76.

In an illustrated example, the LUT forming subsection 70 forms a characteristic correction LUT, as an example, as follows:

As shown in FIG. 4, the film characteristic storing section (hereinafter referred to as "characteristic storing section") 61 for storing the film characteristics of the respective kinds of the film is connected to the LUT forming subsection 70.

Figure 5:
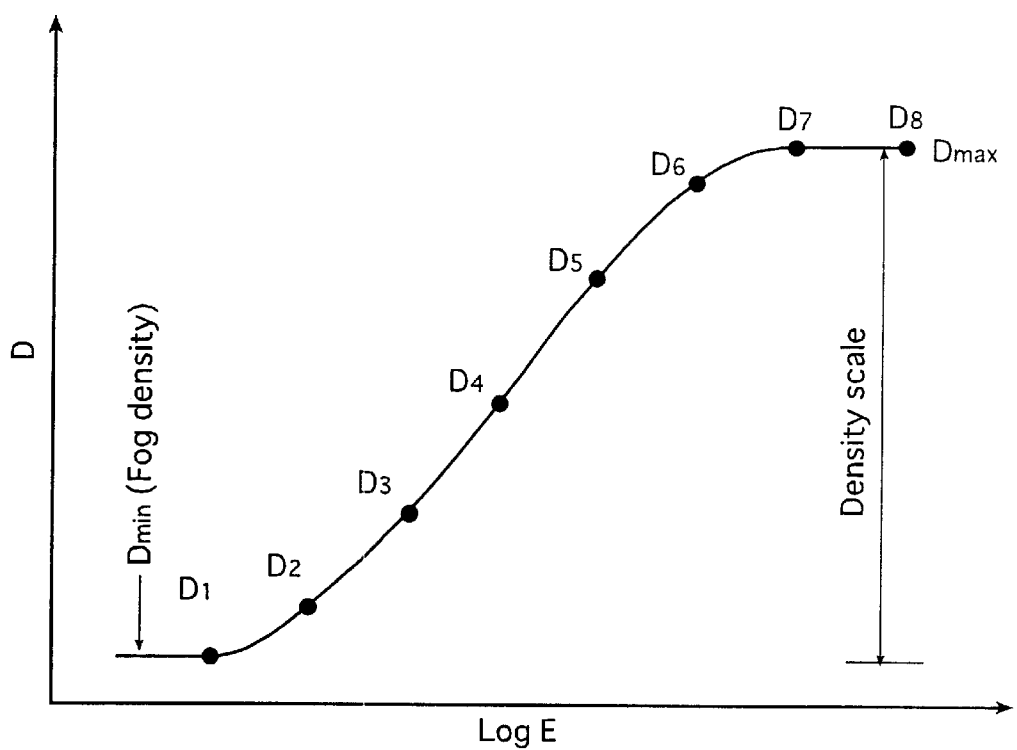
FIG. 5 is a graph of an example of film characteristics.

The film characteristic (for example, gradation characteristic) is shown as a relation between logarithm of light exposure amount E (Log E) and density (D) as shown in FIG. 5. An illustration in FIG. 5 is of a negative film so that only one curve is shown. If the film F is a color film, three curves in accordance with R, G and B will be shown.

Such characteristic curve differs in accordance with not only the kind of film but also R, G and B of the same kind of film.

As an exemplary illustration, data on the lowest density ($D_{min}$) and densities D ($D_1, D_2, \ldots, D_8$) associated with a specified Log E adapted to various kinds of films are made to a database of film characteristics for being stored in the characteristic storing section 61 as follows:

| Negative film A: | [R] | $D_{min}, D_1, D_2, D_3, \ldots, D_8$ |
|---|---|---|
| | [G] | $D_{min}, D_1, D_2, D_3, \ldots, D_8$ |
| | [B] | $D_{min}, D_1, D_2, D_3, \ldots, D_8$ |
| Negative film B: | [R] | $D_{min}, D_1, D_2, D_3, \ldots, D_8$ |
| | [G] | $D_{min}, D_1, D_2, D_3, \ldots, D_8$ |
| | [B] | $D_{min}, D_1, D_2, D_3, \ldots, D_8$ |
| Negative film C: | [R] | $D_{min}, D_1, D_2, D_3, \ldots, D_8$ |
| | [G] | $D_{min}, D_1, D_2, D_3, \ldots, D_8$ |

-continued

[B]    $D_{min}, D_1, D_2, D_3, \ldots, D_8$

Moreover, film characteristics are not limited to be made to such $D_{min}$ and density D associated with Log E and may be stored as a function of a film characteristic curve as follows:

$$D=D_{min(i)}+(D_{max(i)}-D_{min(i)})\times[1/(1+e^{-\log E/a(i)})]$$

Wherein i=R, G and B.
Parameters are:
[R]: $D_{min(R)}$, $D_{max(R)}$, a(R)
[G]: $D_{min(G)}$, $D_{max(G)}$, a(G)
[B]: $D_{min(B)}$, $D_{max(B)}$, a(B)

The LUT forming subsection 70 first receives information of the kind of the film as described later in this specification, and then reads out film characteristics of the corresponding film F from the characteristic storing section 61 and finally forms, being based on the read film characteristics, characteristic correction LUTs for correcting the characteristic change of the film F for R, G and B respectively.

In case of the one time use camera, for example, since characteristics are liable to be changed in an over-exposed range, a specific correction LUT which corrects image data on an output image according to the read film characteristics is formed such that a gradation (γ) in the over-exposure range of the film F increases the inclination of a gradation curve and sent to the parameter coordinating subsection 76.

As described above, the parameter coordinating subsection 76 sets this characteristic correction LUT in the characteristic correction block 66A and image data is subjected to image processing steps after the image data is subjected to the correction of its image quality deterioration due to the characteristic change of the film F.

Therefore, the image processing method of the present invention is advantageous such that high-quality image having appropriately corrected film characteristic change can be acquired and, as a result, specifically in the one time use camera which is liable to be over-exposed, the dynamic range of an over-exposed side is widened, recording region is expanded and decrease of failure is expected.

Here, the film characteristics are affected also with development conditions.

Figure 6A:
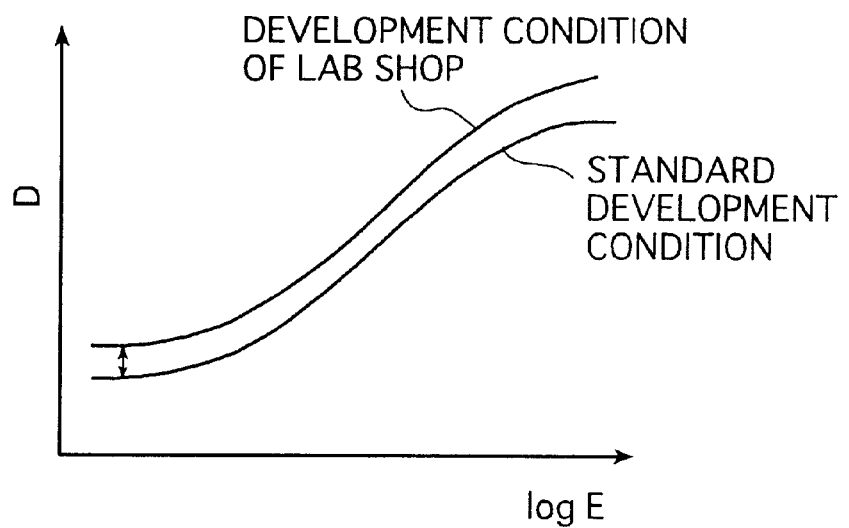
FIGS. 6A and 6B are graphs illustrating another example of the image processing method of the invention.
Figure 6B:
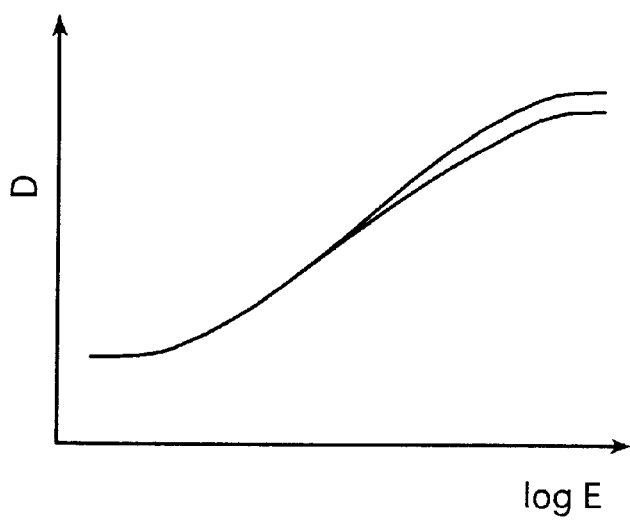

Accordingly, if the development conditions employed by developing sites such as lab shops and the like are different from the standard development conditions, it is more preferable that data read out from the characteristic storing section 61 is corrected with a difference derived from the difference of the ongoing development conditions. As shown in FIG. 6A, for example, a difference between data of $D_{min}$ (base density) region acquired when development is performed at the lab shop and data of $D_{min}$ region acquired when development is performed under the standard development conditions is acquired and then, as shown in FIG. 6B, correction of $D_{min}$ region may be performed according to the acquired difference.

More preferably, a film manufacturer distributes non-developed a sample film subjected to gray wedge exposure to a lab shop and then the lab shop develops the sample film under its respective ongoing development condition. The lab shop reads the developed sample film by a scanner or the like to form a data of the film characteristic.

Figure 7A:
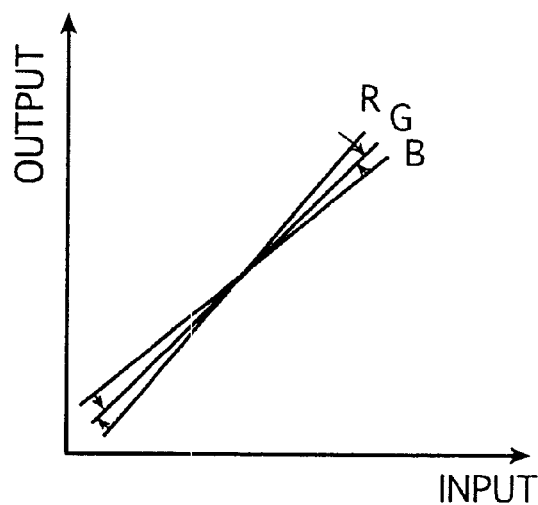
FIGS. 7A and 7B are graphs illustrating still another example of the image processing method of the invention.
Figure 7B:
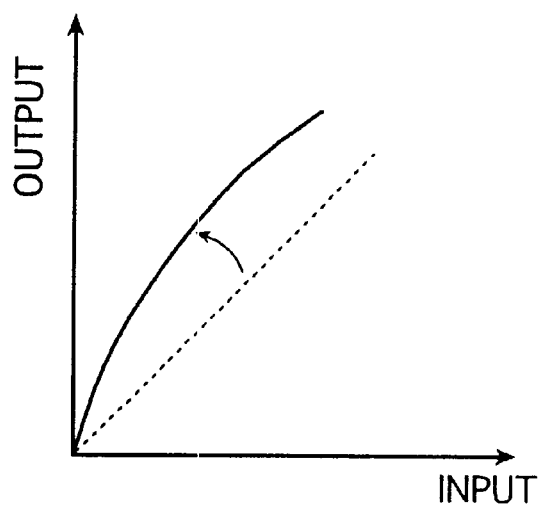

In the above case, film characteristic corrections corresponding to R, G and B have been performed respectively by using characteristic correction LUTs and, besides, may be performed by using at least one of the color balance adjustment (see FIG. 7A) in consideration of data of film characteristics and gradation adjustment (see FIG. 7B) in consideration of data of film characteristics processed such that the inclination of gradation in the under-exposed range is increased according to film characteristics.

Particularly, color balance is sensitive to dispersion of development conditions at lab shops and the like so that color balance correction often causes a problem when data acquired with the standard development conditions is used. Meanwhile, characteristic change in the over-exposed range is not so sensitive to the dispersion of the development conditions that the film characteristic change may be performed by combining gradation adjustment only with data of the film characteristics. In this case, the condition of the color balance adjustment is set up to an ordinary condition.

A method for detecting the film kind is not specifically limited and, in the case of the film F of APS as the illustrated example, it may be of a type that reads magnetic information recorded in magnetic recording media S1 of the film F by magnetic heads 42 so that the film kind is detected from the acquired magnetic information and then the acquired information of the film kind is sent to the LUT forming subsection 70.

Furthermore, regardless of conventional (135 size and the like) and APS films, the film kind may be detected by reading DX code and the like by a code reader 44. Alternatively, an operator may input the film kind using the keyboard 18a.

In the apparatus as illustrated, characteristics of various films are previously made to a database and stored in the characteristic storing section 61 and thereafter read out from the database when the film kind is detected. However, the present invention is not limited to the foregoing embodiment.

In the film F of APS, for example, film characteristics may be recorded magnetically in the magnetic recording media S1 such that the recorded characteristics are thereafter read by magnetic heads 42 of the scanner 30 and provided to the LUT forming section 70. Moreover, regardless of the conventional and APS films, the film characteristics may be previously recorded by a bar code and the like optically in the outside of an image (frame) region of the film such that the optically recorded characteristics on the developed film are thereafter read by the code reader 44 of the scanner 30 or by an image sensor 34 in the same manner as film images are read by the scanner 30.

Moreover, the operator may input the film characteristics using the keyboard 18a and the like seeing the film characteristics that are recorded in advance on the body of the one time use camera or on the cartridge and the like of the film.

Furthermore, disposing an IC memory on the cartridge of APS film is presently under consideration so that discrimination of the film kind and acquirement of the film characteristics may be attained by utilizing this IC memory.

In the illustrated example, as described above, in which the film characteristics are stored in the characteristic storing section 61 and the like after made to a database, it is preferable that addition, renewal, rewriting and the like of the film characteristic data are so arranged as to be easily performed by making use of inputting by the keyboard 18a and the like, reading from recording media such as the floppy disk and the like, supplying data and the like from computer communication.

It is preferable that these film characteristic data are basically provided by a film manufacturer.

Corrections according to the change of the film characteristics are not limited to those adapted to all kinds of films and corrections only of the one time use camera that is liable to cause under- and over-exposure may be performed. In this case, information indicating the film of the one time use camera is recorded in the film magnetically, optically or the like when the film is manufactured so that the film is detected as that of the one time use camera at the time of reading by the scanner 12 and the like.

The setup subsection 72 uses the prescanned data or the like to set the reading conditions for fine scan and supplies them to the scanner 12; in addition, the setup subsection 72 constructs (or calculates) the conditions for the image processing steps to be done in the prescanned image processing section 56 and the fine scanned image processing section 58 and supplies them to the parameter coordinating subsection 76.

Specifically, the setup subsection 72 reads out the prescanned data from the prescan memory 52 and uses it to perform various operations including the construction of density histograms and calculation of various image characteristic quantity such as average density, highlight (minimum density), shadow (maximum density) and the like, thereby determining the reading conditions for fine scan. The setup subsection 72, in response to commands and the like optionally entered by the operator, sets the conditions for image processing steps such as color balance adjustment, gradation adjustment and the like to be done in the above described image processing block 66B (or 62B).

The key correcting subsection 74 calculates the amounts of adjustment of image processing conditions (e.g. the amount of correction of LUTs) typically in accordance with various commands entered by means of keys for adjusting the density (brightness), color, contrast, sharpness, saturation and so forth that have been set in the keyboard 18a or the mouse 18a; the key correcting subsection 74 then supplies the calculated amounts of adjustment into the parameter coordinating subsection 76.

After receiving the characteristic correction LUTs formed in the LUT forming subsection 70 and the image processing conditions set by the setup subsection 72, the parameter coordinating subsection 76 sets them in the processing subsection 62 of the prescanned image processing section 56 and the processing subsection 66 of the fine scanned image processing section 58. Further, in accordance with the amounts of adjustment calculated by the key correcting subsection 74, the parameter coordinating subsection 76 either corrects (adjusts) the image processing conditions set to various sites or makes another setting of image processing conditions.

We now describe the image processing method of the invention in greater detail by explaining the operations of the scanner 12 and the processing apparatus 14.

The operator loads the scanner 12 with a carrier 30 that is associated with the film F, sets the film F (or its cartridge to be more exact) in a specified position on the carrier 30, enters the necessary information such as the size of the prints to be prepared, and thereafter keys in a command for starting print preparation.

In response to the START command, the stop-down value (aperture size) of the variable diaphragm 24 in the scanner 12 and the storage time of the image sensor (line CCD sensors) 34 are set in accordance with the reading conditions for prescan; thereafter, the carrier 30 unwinds the film F from the cartridge and transports it in the auxiliary scanning direction at a specified speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic heads 42 read the magnetic information recorded in the magnetic recording media S and the code reader 44 reads bar codes such as DX code, whereupon the necessary information is sent to a specified site. In the case under discussion, the film kind is detected from the magnetic information recorded in the magnetic recording media S1 and supplied to the LUT forming subsection 70.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by Amp 36 and sent to the A/D converter 38, where they are converted to digital form. The digital signals are sent to the processing apparatus 14, where they are given specified data processing steps in the data processing section 48 and converted to prescanned data (digital image data) in the log converter 50, with the prescanned data being then stored in the prescan memory 52.

The setup subsection 72 in the condition setting section 60 reads out the stored prescanned data from the prescan memory 52, constructs density histograms, calculates image characteristic quantities such as the highlight and shadow, performs any other necessary operations to set the reading conditions for fine scan, which are then supplied to the scanner 12, sets the conditions for various image processing steps such as gradation adjustment, gray balance adjustment and supplies the thus set conditions into the parameter coordinating subsection 76.

Moreover, in the condition setting section 60, the LUT forming subsection 70 reads out the film characteristics in accordance with the kind of the supplied film from the characteristic storing section 61 and constructs characteristic correction LUTs based on the read-out film characteristics for correcting characteristic change of the film F so as to provide the formed LUTs to the parameter coordinating subsection 76.

Upon receiving the characteristic correction LUTs and the image processing conditions, the parameter coordinating subsection 76 sets them at specified sites (hardware) in the prescanned image processing section 56 and the fine scanned image processing section 58, such as, for example, the specified sites being the characteristic correction block 66A and the characteristic correction block 62A.

If verification is to be performed, the prescan processing subsection 62 reads out the prescanned data from the prescan memory 52, processes it by the characteristic correction LUT in the characteristic correction block 62A and also by the image processing conditions set in the image processing block 62B and subsequently converts the processed data to a suitable form in the image data converting subsection 64. The converted data is represented as a simulated image on the display 20.

Looking at the representation on the display 20, the operator checks (verifies) the image, or the result of the processing and, if necessary, manipulates the aforementioned keys on the keyboard 18a or the mouse 18b to adjust the color, density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs, MTXs and other conditions in the processing subsections 62 and 66 as already described above. The image represented on the display 20 also varies in response to this corrective measure, or the inputs for adjustment entered by the operator.

If the operator concludes that the image in the frame of interest represented on the display is appropriate (verification OK), the operator manipulates the keyboard 18a or the mouse 18b to give a command for print start, whereupon the image processing conditions are finalized and set in the scanner 12 in accordance with the reading conditions for fine scan including the stop-down value of the variable diaphragm 24 and, at the same time, carrier 30 transports the film F at a suitable speed, whereby fine scan gets started.

If no image verification is to be performed, the image processing conditions are finalized at the point of time when the parameter coordinating subsection 76 ends setting of the image processing conditions in the processing subsection 66 of the fine scanned image processing section 58, and fine scan gets started.

Fine scan is performed in essentially the same manner as prescan except that the reading conditions are those for fine scan including the stop-down value of the variable diaphragm 24 and the scanning speed of the scanner 12 and the like; the output signals from the image sensor 34 are amplified with Amp 36, converted to digital form in the A/D converter 38, processed by the data processing section 48 in the processing apparatus 14, converted to fine scanned data in the log converter 50 and sent to the fine scan memory 54.

The fine scanned data being sent to the fine scan memory 54 is read out by means of the fine scanned image processing section 58, processed by the characteristic correction LUTs in the characteristic correction block 66A and also under the image processing conditions set in the image processing block 66B and subsequently converted to output image data in the image data converting subsection 68 before it is sent to the printer 16.

The printer 16 is a combination of a printer (exposing device) that records a latent image on a light-sensitive material (photographic paper) by exposing it in accordance with the supplied image data and a processor (developing device) that performs specified wet processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with the abovedescribed light beams. The latent image bearing light-sensitive material is then supplied to the processor. Receiving the light-sensitive material, the processor performs a specified wet development process comprising color development, bleach-fixing and rinsing; the thus processed light-sensitive material is dried to produce a finished print; a plurality of prints thus produced are sorted and stacked in specified units, say, one roll of film.

While the image processing method of the present invention has been described above in detail, it should be noted that the invention is by no means limited to the foregoing embodiments and various improvements and modifications may of course be made without departing from the scope and spirit of the invention.

As described above in detail, the present invention provides a digital image processing method that can constantly and stably produce high-quality prints which are free from quality deterioration caused by inherent film characteristics by correcting these inherent film characteristics in under- and over-exposed ranges and that is particularly suitable for use with a one time use camera which is liable to be over-exposed because of a lack of a diaphragm owing to cost reduction and an image of the over-exposed ranges of which are easily sacrificed. The method of the invention is specifically effective in quality improvement of images on prints by correcting gradation appropriately, though a detrimental effect appears such that roughness caused by grains of films is enhanced in under-exposed ranges.

What is claimed is:

1. An image processing method for subjecting image data obtained by reading an image on a film photoelectrically in a digital photoprinter to specified image processing, comprising the steps of:

acquiring film characteristic of said film; and correcting the image data in the digital photoprinter in accordance with the acquired film characteristic, wherein said film characteristic is corrected by difference data between standard development conditions and adopted development conditions.

2. The image processing method according to claim 1, wherein said film characteristic is gradation characteristic of said film.

3. The image processing method according to claim 1, wherein said film is for a one-time use camera.

4. The image processing method according to claim 1, wherein said correction step is a step of correction corresponding to deterioration of said film characteristic.

5. The image processing method according to claim 1, wherein said correction corresponding to the deterioration of said film characteristic is correction mainly in an over-exposed range of the film, and wherein said correction step is a step of correction corresponding to deterioration of said film characteristic.

6. The image processing method according to claim 1, wherein said acquiring step is at least one of a process of storing film characteristics of plural kinds of the film in a storing means and thereafter reading out a corresponding film characteristic from the storing means by detecting a kind of the film, a process of reading film characteristic information recorded on the film optically, a process of reading the film characteristic information recorded on the film magnetically and a process of inputting the film characteristic by an operator.

7. The image processing method according to claim 1, wherein said acquiring step is at least one of a process of storing film characteristics of plural kinds of the film in a storing means and thereafter reading out a corresponding film characteristic from the storing means by detecting a kind of the film, a process of reading film characteristic information recorded on the film optically, a process of reading the film characteristic information recorded on the film magnetically and a process of inputting the film characteristic by an operator, wherein said film kind is detected from the film by using at least one of an optical process and a magnetic process.

8. An image processing method for subjecting image data obtained by reading an image on a film photoelectrically in a digital photoprinter to specified image processing, comprising the steps of:

acquiring film characteristic of said film; and correcting in the digital photoprinter a balance of gradation of said image based on a correction information of the acquired film characteristic.

9. The image processing method according to claim 8, wherein said film characteristic is expressed in a function manner.

10. The image processing method according to claim 8, wherein said film characteristic is gradation characteristic of said film.

11. The image processing method according to claim 8, wherein said film is for a one-time use camera.

12. The image processing method according to claim 8, wherein said correction step is a step of correction corresponding to deterioration of said film characteristic.

13. The image processing method according to claim 8, wherein said correction step is a step of correction corresponding to deterioration of said film characteristic, wherein said correction corresponding to the deterioration of said film characteristic is correction mainly in an over-exposed range of the film.

14. The image processing method according to claim 8, wherein said acquiring step is at least one of a process of storing film characteristics of plural kinds of the film in a storing means and thereafter reading out a corresponding film characteristic from the storing means by detecting a kind of the film, a process of reading film characteristic information recorded on the film optically, a process of reading the film characteristic information recorded on the film magnetically and a process of inputting the film characteristic by an operator.

15. The image processing method according to claim 8, wherein said acquiring step is at least one of a process of storing film characteristics of plural kinds of the film in a storing means and thereafter reading out a corresponding film characteristic from the storing means by detecting a kind of the film, a process of reading film characteristic information recorded on the film optically, a process of reading the film characteristic information recorded on the film magnetically and a process of inputting the film characteristic by an operator, wherein said film kind is detected from the film by using at least one of an optical process and a magnetic process.

16. The image processing method according to claim 8, wherein said film characteristic is corrected by difference data between standard development conditions and adopted development conditions.

* * * * *